UNITED STATES PATENT OFFICE.

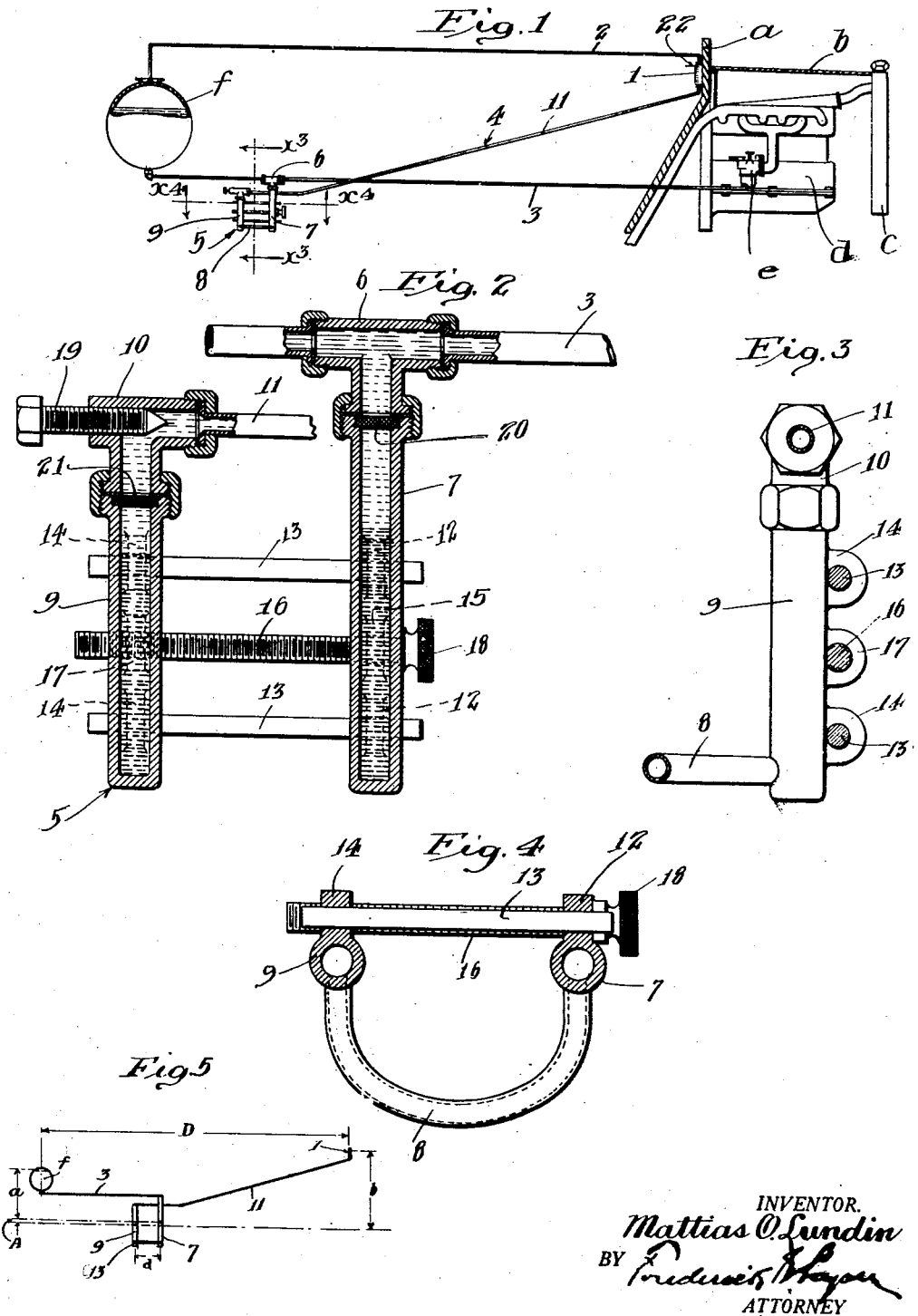

MATTIAS O. LUNDIN, OF LOS ANGELES, CALIFORNIA.

LIQUID-LEVEL GAGE.

1,394,031.  Specification of Letters Patent.  Patented Oct. 18, 1921.

Application filed June 1, 1920. Serial No. 385,781.

*To all whom it may concern:*

Be it known that I, MATTIAS O. LUNDIN, a citizen of the United States, residing at Los Angeles, in the county of Los Angeles and State of California, have invented a new and useful Liquid-Level Gage, of which the following is a specification.

This invention relates to gages of the character employed in indicating the level of liquid in a container, and the invention is especially applicable to indicate the level of liquid in a container at a distance from the sight glass.

An object of the invention is to provide a liquid level gage which will accurately indicate the level of liquid in a container, even though there occur a relative change of level between the container and the sight glass.

Another object of the invention is to make provision for adjustment of the gage to suit different distances between the container and the sight glass.

Another object is to make provision for adjustment of the gage to suit relatively different normal levels of the sight glass and container.

Other objects and advantages will appear in the subjoined detailed description.

The accompanying drawings illustrate the invention.

Figure 1 is a side elevation of a construction embodying the invention, the dash board and hood of a motor vehicle being shown in section and the container being partly in section.

Fig. 2 is an enlarged vertical section of the compensating portion of the conduit.

Fig. 3 is an enlarged elevation partly in section on line indicated by $x^3$—$x^3$ Fig. 1.

Fig. 4 is a plan section on line indicated by $x^4$—$x^4$ Fig. 1.

Fig. 5 is a diagrammatic view illustrating how the terms of equations are applied in determination of the spacing of the vertical legs of the U-tube.

The liquid sight gage embodying the invention may be used in conjunction with any container for indicating the level of liquid therein and, in Fig. 1 of the drawings, the gage is shown as it would appear in place in a motor vehicle, of which the dash board $a$, the hood $b$, the radiator $c$, the engine $d$, the carbureter $e$ and the fuel container or tank $f$ are shown.

On the dash board $a$, or at any other convenient location, is mounted a sight glass 1 which may be connected by a tube 2 to the container $f$, if a pressure system is employed for forcing the fuel from the container to the carbureter $e$. If the vacuum or gravity fuel supply system is employed, the tube 2 may be omitted.

A conduit, indicated in general by the character 3, connects the container $f$ with the carbureter $e$ and the fuel flows through this conduit from the container to the carbureter. The conduit 3 is connected to the sight glass 1 by a second conduit, indicated in general by the character 4, in which is a level-compensating loop 5. It is understood that the loop 5 may be formed of plain tubing by bending the same or may be constructed of short pieces of tubing and pipe fittings connecting such short pieces with one another. The latter construction is preferred for the purpose of making the loop adjustable and it will now be described.

The conduit 3 contains a T-union 6 to which is connected the upper end of a vertical tube 7 closed at its lower end. The tube 7 is connected near its lower end by a bendable tube 8 with the lower portion of a second vertical tube 9 which is also closed at its lower end. The upper end of the tube 9 is connected by an elbow union 10 to a tube 11 which passes the tube 7 and which is connected with the sight glass 1. It will be clear that because of the provision of the bendable tube 8, the vertical tubes 7, 9 may be adjusted toward and from one another. This adjustment may be effected by any suitable means and, in the drawings, the construction relied upon to effect the adjustment is as follows: The tube 7 is provided with outstanding lugs 12 in which are firmly secured guides in the form of rods 13 that project through and slidably engage lugs 14 projecting from the tube 9. Between the lugs 12 the tube 7 is provided with a lug 15 loosely engaged by a screw 16 which is screwed through a lug 17 projecting from the tube 9. The head 18 of the screw 16 may be turned by hand and said head engages the lug 15. Thus when the screw 16 is turned it decreases or increases the distance between the tubes 7, 9, the guides 13 functioning to maintain the tubes 7, 9 in parallelism. When the tubes 7, 9 are thus relatively adjusted, the tube 8 will bend and thus accommodate itself to the changed distance between the tubes 7, 9.

The elbow 10 is provided with a screw plug 19 in axial alinement with the tube 11. The tubes 7, 8, 9 are supplied with a fluid of relatively high specific gravity such, for example, as mercury, and the tube 4 will be filled with a lighter, preferably non-freezing liquid. A screen 20, impermeable to the heavier liquid in the tube 7, is inserted between the union 6 and tube 7. A screen 21, impermeable to the heavier liquid in the tube 9, is inserted between the tube 9 and union 10. The screens 20, 21 may be formed of any material suited to the purpose such, for example, as sheep skin, and they prevent the outflow of the heavier liquid from the tubes 7, 9.

In installing the invention, the different parts will be connected up after the manner shown in Fig. 1, the tubes 7, 9 having previously been supplied with a fluid such, for example, as mercury. Also the conduit 4 will be filled with a liquid which can be seen in the sight glass 1. The liquid in the tube 11 will preferably be non-freezing and may be colored, if desired, so as to be seen more clearly in the sight glass. After the apparatus has been installed, the container may be provided with fuel to any desired level. Different levels or volumes equivalent thereto to correspond with different levels of liquid in the container are indicated on the sight glass 1 by a series of graduations of a scale 22. The tubes 7, 9 will be adjusted relative to one another so that the distance therebteween is a certain predetermined ratio of the distance between the container $f$ and sight glass 1. The spacing of the tubes 7, 9 is dependent upon several factors, one being the distance between the container $f$ and sight glass 1, and another being the difference in specific gravities of the various fluids in the apparatus. After the relative adjustment has been made between the tubes 7, 9 in accordance with the predetermined ratio, if the level or volume of the liquid in the container $f$ is not correctly indicated in the sight glass, the plug 19 will be screwed in or out to displace more or less liquid until the level or volume is correctly indicated.

As the fuel is used in the carbureter $e$, the level of the fuel in the container $f$ lowers, thus tending to reduce the head or pressure on the mercury in the tube 7, resulting in rising of the mercury in the tube 7, and lowering of the mercury in the tube 9. Lowering of the mercury in the tube 9 permits liquid in the tube 11 to discharge into the tube 9, thus lowering the level of liquid in the sight glass 1.

Of course the results mentioned in the preceding paragraph would occur just the same if the positions of the tubes 7, 9 were reversed, in which event the loop construction would be destroyed and replaced by a U-shape trap for the mercury. The advantage of the loop construction will be seen if it be assumed that the motor vehicle is tilted forwardly and downwardly so as to produce a lowering of the sight glass relative to the container. Lowering of the sight glass reduces the head or pressure of liquid in the tube 11 and it would therefore be expected that the mercury would rise in the tube 9 and lower in the tube 7. But the tilting of the vehicle also produces tilting of the compensating loop, which tilting would have a tendency to cause the mercury to rise in the tube 7 and lower in the tube 9, and this tendency is counteracted by the change of head or pressure in the tube 11 so that, actually, the liquids remain in equilibrium without change of level of the liquids in the container and sight glass.

Mention is made above of the adjusting of the spacing of the tubes 7, 9 to agree with a certain predetermined ratio of the distance between the container $f$ and sight glass 1, and the mathematical method of determining the spacing of the tubes 7, 9 is as follows: Let $a$ equal the height of the liquid fuel column, $b$ the height of the level-indicating column, A the difference in levels of the heavier liquid in the tubes 7, 9, D the distance between the vertical axes of the sight glass and container, and $d$ the distance between the vertical axes of the tubes 7, 9. Also let $g'$ be the specific gravity of the liquid fuel, $g^2$ the specific gravity of the liquid, for example mercury, in the tube 8 and lower portions of the tubes 7, 9 and $g^3$ the specific gravity of the liquid in the level-indicating column. If liquids of the same specific gravities be employed for fuel and for the level-indicating column, then the equation will be expressed thus:—

$$d = \frac{D}{\frac{g^2}{g^1} - 1}$$

and the values of $a$, A and $b$ may be ignored. If, however, liquids of different specific gravities be employed for fuel and for the level-indicating column, then the heads of said liquids must be taken into consideration and, first working for the value of A, the equation may be expressed thus:—

$$A = \frac{bg^3 - ag'}{g^2}.$$

Having found the value of A it is substituted for A in the equation $$d = \frac{DA}{b - a - A}.$$

From the foregoing it is seen that in the determination of the level of liquid in the container $f$, I interpose a U-shape column of liquid between the column whose level is to be determined and the column of liquid which is to indicate the liquid level, or, in other words, I superpose the weight of the column whose level is to be determined upon one leg of a U-shape column of liquid, and I superpose the weight of a third column of liquid upon the other leg of the U-shape column, the specific gravity of the liquid in the U-shape column being higher than the specific gravities of the liquids in the other columns. Also the fuel column extends across the level-indicating column.

I claim:

A liquid level gage comprising a conduit having a U-shape trap, means to adjustably space the legs of the U-shape trap, means at one end of the conduit to indicate the level of liquid at said end, and liquids of different specific gravities in the conduit, the heavier liquid being in the lower portion of the trap.

Signed at Los Angeles, California, this 25th day of May, 1920.

MATTIAS O. LUNDIN.

Witnesses:
GEORGE H. HILES,
L. BELLE WEAVER.